April 13, 1926.

A. GUISSART ET AL

ELECTRIC TOASTER

Filed June 2, 1922

1,580,244

INVENTORS
Albert Guissart
Edgar H. Barbe
BY
Warren S. Ortow.
ATTORNEY

Patented Apr. 13, 1926.

1,580,244

UNITED STATES PATENT OFFICE.

ALBERT GUISSART AND EDGAR H. BARBE, OF NEW YORK, N. Y.; SAID GUISSART ASSIGNOR TO SAID BARBE.

ELECTRIC TOASTER.

Application filed June 2, 1922. Serial No. 565,438.

*To all whom it may concern:*

Be it known that we, ALBERT GUISSART, a citizen of the United States, and a resident of the city, county, and State of New York, and EDGAR H. BARBE, a citizen of the United States, and a resident of the city, county, and State of New York, have invented certain new and useful Improvements in Electric Toasters, of which the following is a specification.

The invention relates in general to a toaster of the type commonly employed for use in toasting sliced bread and other material, and the invention specifically relates to mechanism for presenting first one and then the other side of the bread to the toasting effect of the heating unit or element of the toaster.

The primary object of the invention is to provide a simple form of toaster in which one or a plurality of slices of bread may be conveniently disposed in close proximity to the heating effect of the toasting unit, and in which the slice or slices may be readily reversed in position so as to bring the opposite or previously-exposed side into position facing and in close juxtaposition to the heating unit.

Another object of the invention is to provide a single, manually actuated control for simultaneously reversing the position of a plurality of slices of bread relative to the heating unit, and to effect this operation through mechanism which will feature simplicity of structure, a minimizing of the number of parts which may get out of order and which may be actuated conveniently by the operator without danger of burning her fingers.

Still another object is to provide a structure of the type outlined which is designed so as to be produced economically in factory production and the disclosure thus features parts which can be formed of simple pressings and stampings and which can be assembled without the necessity of employing skilled labor.

Another object of the invention when considered in connection with the invention as embodied in an electric heater, is to provide an automatic control for the current supply regulated by the position of the bread holders relative to the heating unit.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1:
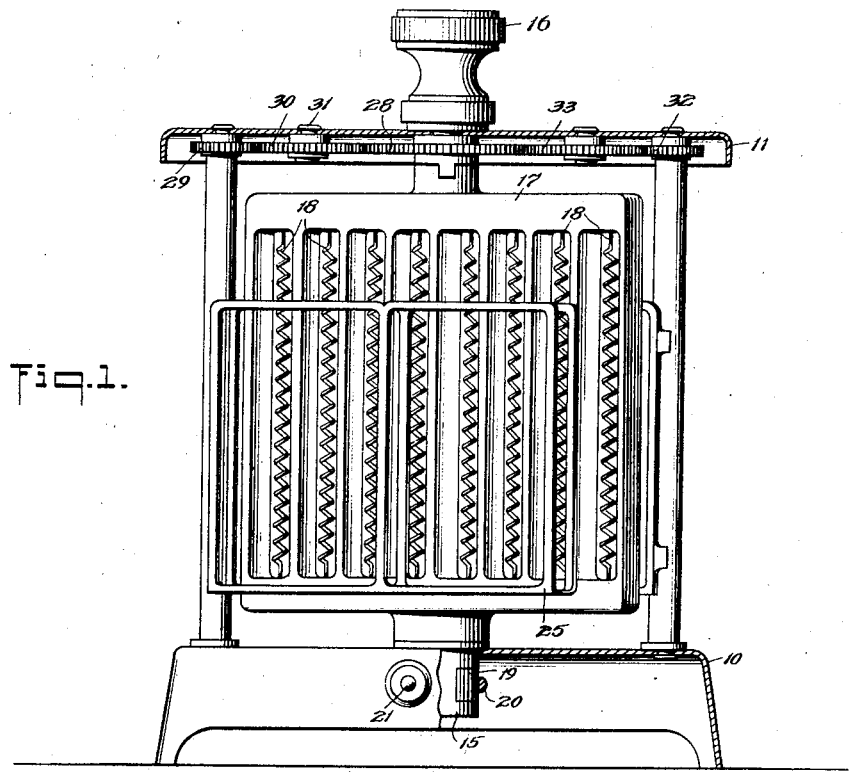
Figure 2:
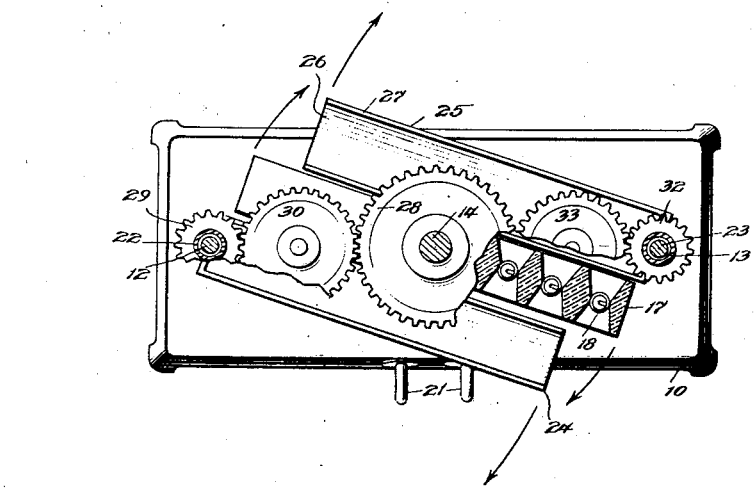

In the accompanying drawing, Fig. 1 is a view in side elevation of a preferred embodiment of the invention with parts broken away to show details of construction; and Fig. 2 is a plan view of a device shown in Fig. 1 with the cover removed, and with a part of the heating unit shown in horizontal section.

In the following description and in the claims, parts will be identified by specific names for convenience of expression but they are intended to be as generic in their application to similar parts as the art will permit.

The toaster comprises a skeleton frame which includes a rectangular stamped metal base plate 10 and a similarly formed top plate 11 secured by pair of upstanding posts or rods 12 and 13, a centrally disposed main shaft 14 extends through the base and top plates and is supported in a journal box 15 carried by the base plate 10. The shaft 14 is rotated by means of an insulated knob 16 projecting above the top plate 11. A heating unit 17, in the drawings shown to be a two-sided flat electrically energized radiator, is so fixed to the part of the shaft 14 between the plates 10 and 11 so as to turn with the shaft as it is rotated to affect a reversal of the slices of bread being toasted. The radiator includes a plurality of heating coils 18 connected electrically at their lower ends with a pair of contact plates one of which is shown at 19 and which are inset in the base 15. The contact plates are adapted to be engaged by contact brushes 20, carried by the pair of contact points 21, which are supported by the base plate and adapted to be engaged by the usual form of socket connection with a source of electric energy, such as the house lighting circuit. The contact plates 20 and their co-acting brushes are so disposed that when the heating element is turned into a neutral position, such as the position in which it is intended to assume while being charged with the bread, the supply of current to the device will be automatically shut off close to the movement of the plates away from the brushes and the current and will be restored when the heating unit is disposed in position with the bread facing the heating unit. In this way the circuit closer provided by the contact plates and brushes will intercept the flow of electric current to the heating unit while the bread holders are being moved from one to their reverse position and in this way there is effected a saving in the current consumed.

Each of the rods 12 and 13 provide bearings respectively for tubular holder shafts 22 and 23. Each of these shafts are positioned at opposite ends of bread holders 24 and 25 and the parts are so proportioned, as shown in Fig. 2, that the holders can extend parallel to each other on opposite sides of the flat radiator and have a length substantially equal to the length of the radiator. These breadholders are of the usual U-shape form in cross-section and each include a bracket ledge 26 upon which a slice of bread is supported edgewise, and include a pair of spaced apart open sides 27 all as is usual in such construction.

The shafts 14, 22 and 23 are connected so as to be rotated in unison by means of a planetary gear train housed beneath the top plate 11. The gear train includes a relatively large main gear 28 fixed to the shaft 14 and rotated by the manipulation of the handle 16. The shaft 22 is provided with a relatively small gear 29 meshing with the main gear 28 on one side thereof through an idler gear 30, mounted on a sub-shaft 31 depending from the plate 11. Similarly, the shaft 23 is provided with a small gear 32 which meshes with the opposite side of the main gear 28 through an idler gear 33. The parts are so constructed and the gear to the radiator so designed that the rotation of the shaft 14 in one direction such as the clockwise direction indicated by the arrows in Fig. 2, and over an angle of about 140 degrees will in like manner rotate the shafts 22 and 23 over an angle of about 320 degrees. This will have the effect of swinging each of the breadholders about its axis of rotation to the opposite side of the heating unit. This movement will cause the breadholders to reverse their positions with relation to the unit, and at the same time will cause the side of each holder which was previously facing the heating unit to become the outside, thus presenting the previous outer side to the heating unit. In this way, the rotation of the handle 16 in one direction, such as the clockwise direction indicated by the arrows in Fig. 2, and over almost a half revolution, will cause the breadholders to reverse their position relative to the heating unit, and in this way both sides of the bread may be toasted. It is obvious that a reverse movement of the handle 16, that is, an anti-clockwise movement, will again change the positions of the holders relative to the unit, and bring the parts back to the position indicated in Fig. 2.

In order to load the device, the handle 16 is but partially rotated so as to bring the breadholders into position extending outwardly of their axis of rotation and in position so that the slices of bread may be conveniently disposed in the holders while they extend outwardly of the frame. While in this intermediate position, the current is intercepted at the circuit closer and no current is flowing. As soon as the holders are moved back into position by the rotation of the handle in either direction, the current flow is automatically restored. Should it be desired to interrupt the toasting action, it is simply necessary to partially rotate the handle so as to move the bread away from the heating unit which action will simultaneously shut off the current.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

Having thus described our invention, we claim:—

1. In a bread toaster the combination of a frame, three shafts disposed in line and journalled in said frame, a heating unit secured to the middle shaft to rotate therewith, and a pair of bread holders secured at their ends to the other shafts to rotate therewith, a gear train including a relatively large gear secured to the middle shaft, relatively small gears secured to the other shafts and idler gears between the large middle gear and the small gears, said gears having ratios to cause the holders to reverse their positions relative to the unit and to cause the holders each to reverse the side facing the unit.

2. In a bread toaster, the combination of a gear train a two-sided heating unit secured to one of the end gears to rotate thereunto over a limited angle, a bread holder secured to the other end gear to rotate thereunto into two limiting positions, said holder disposed in one of said positions with one side facing one side of the heating unit and disposed in its other position with its opposite side facing the other side of the heating unit.

3. In a toaster, the combination of a flat heating unit mounted for rotary movement about an axis within its outlines, a bread holder mounted for rotary movement about an axis at one end thereof and adjacent to but outside of the path of the rotating unit said holder adapted to be swung on its axis to bring the bread carried thereby in close juxtaposition to opposite sides of the heating unit.

4. In a bread toaster, the combination of a planetary bear train comprising five gears meshing in order, a flat heating unit secured to the middle gear to turn about the axis thereof, when the middle gear is rotated, means for supporting slices of bread in position to be rotated about the axis of each of the end gears, and adapted when the center gear is rotated to present opposite sides of each slice to the heating unit.

5. In a toaster, the combination of a flat heating unit, holders on opposite sides for disposing slices of bread in close juxtaposition to the opposite flat sides of the unit, means operatively connecting the holders for causing them simultaneously to reverse the sides of the bread facing the heating unit whereby both sides of each slice of bread is positioned close to the heating unit.

6. In a toaster, the combination of a heating unit, mounted for rotary movement, bread holders on opposite sides of the heater, and means operatively connecting the heating unit and the holders for reversing the sides of the holders facing the unit as the unit is rotated.

7. In a bread toaster, the combination of a two-sided heating unit, a single bread holder pivotally mounted for positioning a slice of bread in close juxtaposition to opposite sides of the unit, and means operatively connected to the holder for swinging the same relative to the unit thereby to receive the sides of the bread facing the unit.

8. In an electric bread toaster, the combination of a frame, a main shaft journalled in the frame, an electric heating unit operatively connected to turn with the main shaft, a pair of holder shafts journalled in the frame, bread holders operatively connected to turn with the holder shafts, a planetary gear train connecting the shafts, and means for actuating the gear train.

9. In a toaster, the combination of a flat heating unit, bread holders for positioning slices of bread in close juxtaposition to opposite sides of the unit, and manually actuated means for simultaneously reversing the sides of the bread exposed to the heating unit.

10. In a toaster, the combination of an electrical heating unit, a circuit closer for controlling the supply of electric current leading to the unit, a bread holder adapted to be reversed to bring opposite sides into position facing the unit, and means operatively connected to the circuit closer for intercepting the current flow to the unit while the holder is moving from one to the other of its positions facing the unit.

11. In a toaster, the combination of a bread holder, a heating unit movable relative to the holder, and a circuit closer for controlling current leading to the unit, said circuit and closer being operatively dependent on the relative position of the unit and holder.

12. In a toaster, the combination of an electrically energized heating unit, a bread holder, manually actuated means for controlling the position of the holder relative to the heating unit and for simultaneously controlling the supply of electric current leading to the unit.

13. In a toaster, the combination of a frame, an electrically energized heating unit mounted in the frame for rotary movement, and electric heads carried by the frame and connected electrically to said unit in all positions of the same.

14. In a device of the class described, the combination of a bread holder, means for toasting the bread carried by the holder and means actuated by the movement of the holder for controlling the operativeness of the toasting means.

15. An electric toaster comprising a stand provided with a heating element, a reversible bread holder rotatably mounted at each side of the heating element, and means connected to both of said bread holders to simultaneously reverse the same to present opposite sides thereof to the heating element.

16. An electric toaster comprising a stand provided with an upright heating element exposed at opposite sides thereof, a reversible bread holder pivotally and swingingly supported on the stand at opposite sides of the heating element, and means connected to both of said bread holders to simultaneously swing and turn the same to reverse position with respect to the heating element.

17. An electric toaster comprising a stand, an upright heating element thereon effective from opposite sides, a pair of bread holders movably mounted on said stand at opposite sides of said heating element and each having two surfaces adapted for exposure to said heating element, and means for reversing all of said bread holders with respect to said heating element to successively present the opposite surfaces thereof to said heating element.

18. An electric toaster comprising a heating element, a bread holder having two surfaces adapted for exposure to said heating element, and means for swinging said bread holder toward and away from said heating element and for reversing it with respect to said heating element during its swinging movements to successively present the opposite surfaces of said bread holder to said heating element.

This specification signed this 20th day of May, 1922.

ALBERT GUISSART.
EDGAR H. BARBE.